United States Patent
Auxier et al.

(10) Patent No.: US 10,815,792 B2
(45) Date of Patent: Oct. 27, 2020

(54) GAS TURBINE ENGINE COMPONENT WITH A COOLING CIRCUIT HAVING A FLARED BASE

(71) Applicant: United Technologies Corporation, Farmington, CT (US)

(72) Inventors: James Tilsley Auxier, Bloomfield, CT (US); Jeffrey T. Morton, Manchester, CT (US); Matthew S. Gleiner, Redondo Beach, CA (US); Parth Jariwala, Cambridge, MA (US); Charles Thistle, New Haven, CT (US); Megan J. Kwolek, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 20 days.

(21) Appl. No.: 16/239,949

(22) Filed: Jan. 4, 2019

(65) Prior Publication Data
US 2020/0217208 A1 Jul. 9, 2020

(51) Int. Cl.
*F01D 5/18* (2006.01)
*F01D 25/12* (2006.01)

(52) U.S. Cl.
CPC .......... *F01D 5/187* (2013.01); *F01D 25/12* (2013.01); *F05D 2220/32* (2013.01)

(58) Field of Classification Search
CPC ................. F01D 5/187; F01D 25/12
See application file for complete search history.

(56) References Cited

U.S. PATENT DOCUMENTS

| 8,047,787 | B1 | 11/2011 | Liang | |
|---|---|---|---|---|
| 8,974,182 | B2 * | 3/2015 | Boyer | F01D 5/186 416/97 R |
| 9,051,842 | B2 * | 6/2015 | Smith | F01D 5/186 |
| 9,896,940 | B2 | 2/2018 | Boeck et al. | |
| 10,107,107 | B2 * | 10/2018 | Boeke | F01D 5/187 |
| 2012/0076654 | A1 | 3/2012 | Maldonado | |
| 2014/0000262 | A1 | 1/2014 | Boeke | |
| 2016/0017724 | A1 * | 1/2016 | Xu | B22F 3/1055 415/208.1 |

FOREIGN PATENT DOCUMENTS

| EP | 1016773 | 7/2000 |
|---|---|---|
| JP | S5047014 | 4/1975 |

OTHER PUBLICATIONS

European Search Report for Application No. 20150358.9 dated Mar. 6, 2020.

* cited by examiner

*Primary Examiner* — Richard A Edgar
(74) *Attorney, Agent, or Firm* — Carlson, Gaskey & Olds, P.C.

(57) ABSTRACT

A component for a gas turbine engine includes a body portion that extends between a leading edge and a trailing edge of the component. The trailing edge includes a flared region and a non-flared region. At least one discharge slot is disposed at least partially within the flared region of the component.

11 Claims, 4 Drawing Sheets

GAS TURBINE ENGINE COMPONENT WITH A COOLING CIRCUIT HAVING A FLARED BASE

BACKGROUND

This disclosure relates to a gas turbine engine component, and more particularly to a gas turbine engine component having at least one discharge slot.

Gas turbine engines typically include a compressor section, a combustor section and a turbine section. In general, during operation, air is pressurized in the compressor section and mixed with fuel and burned in the combustor section to generate hot combustion gases. The hot combustion gases flow through the turbine section, which extracts energy from the hot combustion gases to power the compressor section and other gas turbine engine loads.

The compressor and turbine sections of the gas turbine engine typically include alternating rows of rotating blades and stationary vanes. The rotating blades extract the energy from the hot combustion gases that are communicated through the gas turbine engine, and the vanes convert the velocity of the airflow into pressure and prepare the airflow for the next set of blades. The hot combustion gases are communicated over airfoils of the blades and vanes. The airfoils can include internal cooling circuits that receive airflow to cool the airfoils during engine operation. The cooling circuits may include discharge slots that discharge the cooling airflow from the airfoils.

SUMMARY

In one exemplary embodiment a component for a gas turbine engine includes a body portion that extends between a leading edge and a trailing edge, wherein the trailing edge includes a flared region and a non-flared region, and at least one discharge slot is disposed at least partially within the flared region.

In another example of the above described component for a gas turbine engine the at least one discharge slot has a first portion that includes an oval geometry.

In another example of any of the above described components for a gas turbine engine the component is one of a vane and a blade.

In another example of any of the above described components for a gas turbine engine the at least one discharge slot includes a plurality of discharge slots.

Another example of any of the above described components for a gas turbine engine further includes at least a second discharge slot disposed radially outward of the first plurality of discharge slots.

Another example of any of the above described components for a gas turbine engine further includes at least a second discharge slot disposed radially inward of the first plurality of discharge slots.

In another example of any of the above described components for a gas turbine engine a thickness of the flared region increases as the trailing edge is approached.

In another example of any of the above described components for a gas turbine engine a thickness of the non-flared region decreases as the trailing edge is approached.

In another example of any of the above described components for a gas turbine engine at least a portion of the flared region is disposed within a filleted section of the body portion.

In another example of any of the above described components for a gas turbine engine the at least one discharge slot is positioned at a position that is immediately adjacent to a platform of the component.

In one exemplary embodiment a gas turbine engine includes a compressor section, a combustor section in fluid communication with the compressor section along a core flow path, a turbine section in fluid communication with the combustor section along the core flow path, a component that extends into the core flow path within at least one of the compressor section and the turbine section, wherein the component includes a body portion that extends between a leading edge and a trailing edge, wherein the body portion includes an internal cooling circuit having flared region having a thickness that increases as the trailing edge is approached at a consistent span and a non-flared region having a thickness that remains constant or decreases as the trailing edge is approached at a consistent span, and wherein the component further includes at least one internal cooling circuit discharge slot is disposed at least partially within the flared region.

In another example of the above described gas turbine engine the component is one of a vane and a blade.

In another example of any of the above described gas turbine engines the at least one discharge slot includes a plurality of discharge slots and wherein each discharge slot in the plurality of discharge slots is disposed with the flared region.

Another example of any of the above described gas turbine engines further includes a second set of discharge slots, and wherein each discharge slot in the second set of discharge slots is disposed in the non-flared region.

In another example of any of the above described gas turbine engines each discharge slot in the flared region is radially inward of each discharge slot in the non-flared region.

In another example of any of the above described gas turbine engines each discharge slot in the flared region is radially outward of each discharge slot in the non-flared region.

In another example of any of the above described gas turbine engines at least a portion of the flared region is disposed in a fillet of the component.

In another example of any of the above described gas turbine engines at least a portion of the flared region is disposed outside of a fillet of the component.

In another example of any of the above described gas turbine engines the flared region is disposed at a radially innermost edge of the component, relative to a radius of the gas turbine engine.

In another example of any of the above described gas turbine engines the flared region extends less than 100% of the distance from the leading edge to the trailing edge.

The various features and advantages of this disclosure will become apparent to those skilled in the art from the following detailed description. The drawings that accompany the detailed description can be briefly described as follows.

DETAILED DESCRIPTION

Figure 1:
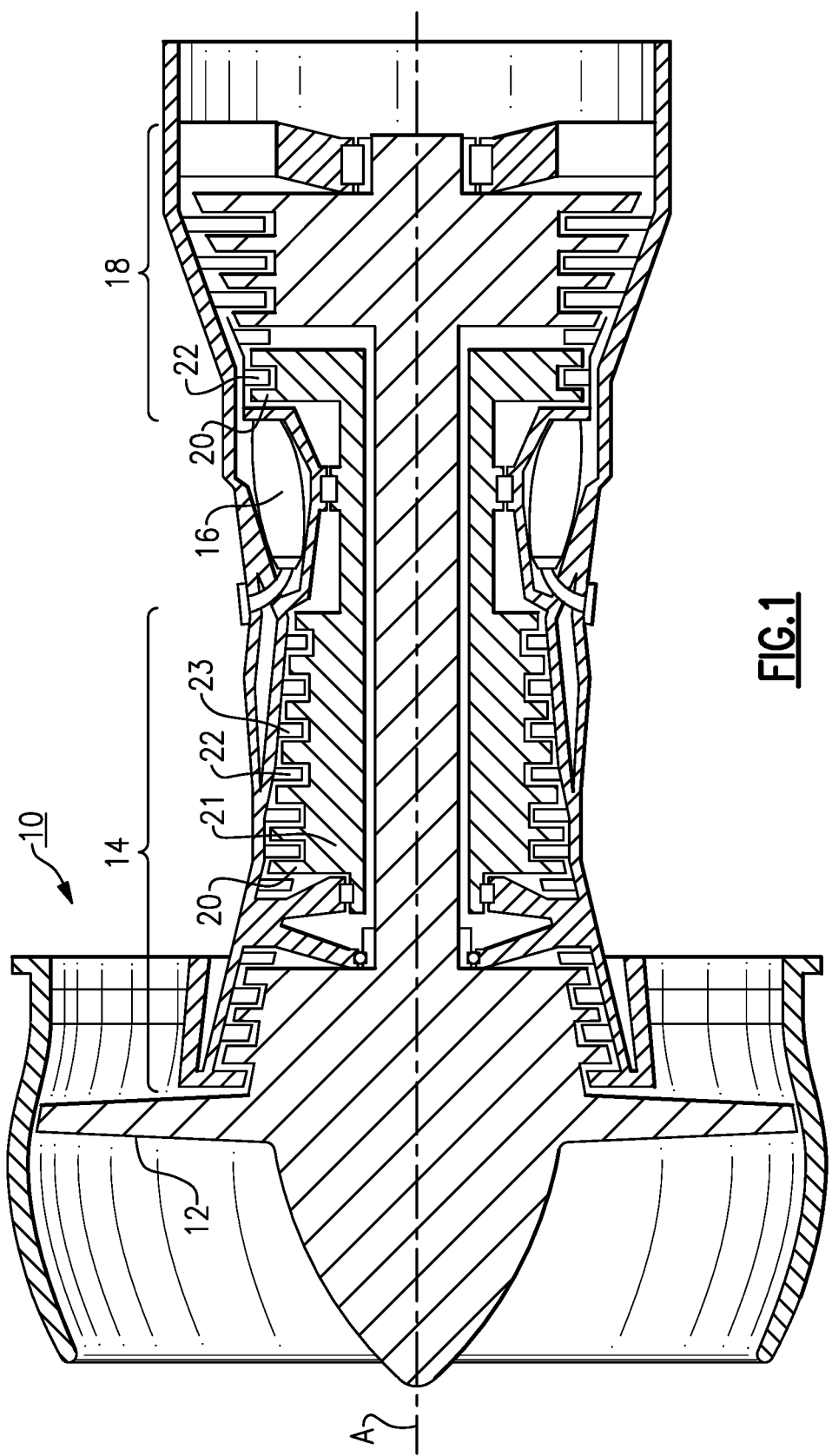
FIG. 1 schematically illustrates a gas turbine engine.

FIG. 1 illustrates an example gas turbine engine 10 that is circumferentially disposed about an engine centerline axis A. The gas turbine engine 10 includes (in serial flow communication) a fan section 12, a compressor section 14, a combustor section 16 and a turbine section 18. During operation, air is compressed in the compressor section 14 and is mixed with fuel and burned in the combustor section 16. The combustion gases from the combustor section 16 are discharged through the turbine section 18, which extracts energy from the combustion gases for powering the compressor section 14, the fan section 12, and other gas turbine engine loads.

The compressor section 14 and the turbine section 18 may include alternating rows of rotor assemblies 21 and vane assemblies 23. The rotor assemblies 21 include a plurality of rotating blades 20, while each vane assembly 23 includes a plurality of stator vanes 22. The blades 20 of the rotor assemblies 21 create or extract energy (in the form of pressure) from the airflow that is communicated through the gas turbine engine 10. The vanes 22 direct airflow to the blades 20 to either add or extract energy.

Various components of the gas turbine engine 10, including airfoils such as the blades 20 and vanes 22 of the compressor section 14 and the turbine section 18, may be subjected to repetitive thermal cycling under widely ranging temperatures and pressures. The hardware of the turbine section 18 is particularly subjected to relatively extreme operating conditions. Therefore, some components may require internal cooling circuits for cooling the parts during engine operation. Example cooling circuits that include trailing edge discharge slots for cooling these components are discussed below.

This view is highly schematic and is included to provide a basic understanding of a gas turbine engine and not to limit the disclosure. This disclosure extends to all types of gas turbine engines and for all types of applications.

Figure 2:
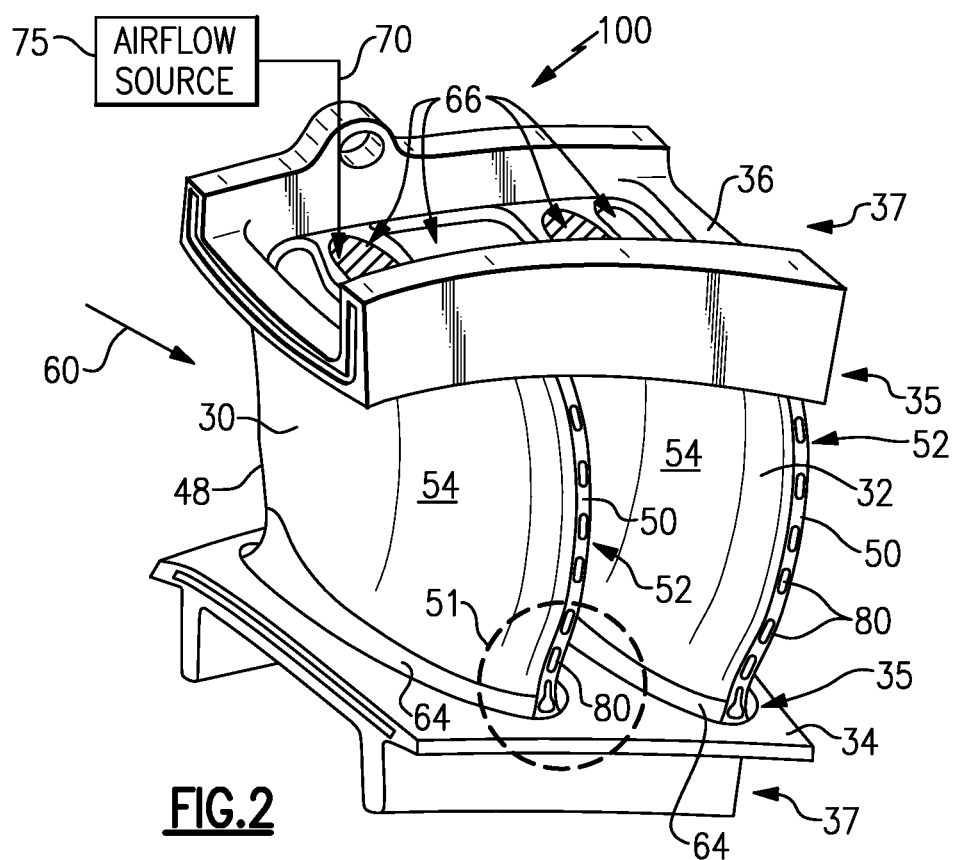
FIG. 2 illustrates a component that can be incorporated into a gas turbine engine.

FIG. 2 illustrates an exemplary component 100 that can be incorporated into a gas turbine engine, such as the gas turbine engine 10. In this embodiment, the component 100 is represented as a vane doublet of the turbine section 18. However, the component 100 can be incorporated into other sections of a gas turbine engine 10, including but not limited to the compressor section 14, and is not necessarily limited to vane doublets. For example, this disclosure could extend to vane singlets or other vane assemblies, or to any other airfoil, including the blades 20 and vanes 22 of the compressor section 14 and the turbine section 18. This disclosure could also extend to non-airfoil components, such as blade outer air seals (BOAS), or any other components that extend into the core flow path of the gas turbine engine 10.

The exemplary component 100 includes a first body portion 30 and a second body portion 32 that is adjacent to the first body portion 30. In this embodiment, the body portions 30, 32 are airfoils. The component 100 could include only a single body portion or multiple body portions. The body portions 30, 32 extend in span between an inner platform 34 (on an inner diameter side) and an outer platform 36 (on an outer diameter side). Both the inner platform 34 and the outer platform 36 include a gas path side 35 and a non-gas path side 37 (i.e., the side secluded from the gas path 60).

Each body portion 30, 32 includes a leading edge 48, a trailing edge 50, a pressure side 52 and a suction side 54. The body portions 30, 32 extend in chord between the leading edge 48 and the trailing edge 50.

A gas path 60 is communicated axially downstream through the gas turbine engine 10 in a direction that extends from the leading edge 48 toward the trailing edge 50 of the body portions 30, 32. The gas path 60 (for the communication of core airflow along a core flow path) extends between the gas path sides 35 associated with each of the inner platform 34 and the outer platform 36. The gas path sides 35 of the inner platform 34 and the outer platform 36 are connected to the body portions 30, 32 via fillets 64.

The component 100 can include an internal circuit 66 that receives a cooling airflow 70 from an airflow source 75 that is external to the component 100. Although depicted at the outer platform 36, the airflow source 75 could also communicate the cooling airflow 70 at the inner platform 34. The cooling airflow 70 is at a lower temperature than the airflow of the gas path 60 that is communicated across the body portions 30, 32. In one embodiment, the cooling airflow 70 is a bleed airflow that can be sourced from the compressor section 14 or any other portion of the gas turbine engine 10 that is at a higher pressure and lower temperature than the component 100. The cooling airflow 70 is circulated through the internal circuit 66 to transfer thermal energy from the component 100 to the cooling airflow 70, thereby cooling portions of the component 100. As is further discussed below, the trailing edge 50 can include one or more discharge slots 80 that are in fluid communication with the internal circuit 66 for discharging the cooling airflow 70 from the body portions 30, 32.

In a cast component, as well as components constructed using certain other manufacturing techniques, the internal circuit 66 is defined by a core. By way of example, the core can be a solid ceramic structure about which the component is cast. The core is a three dimensional negative of the circuit 66, or a portion of the circuit 66. Once cast, or otherwise constructed around the core, the core is removed leaving a void within the cast or otherwise constructed component. The void defines all or part of the internal cooling circuit 66. The removal can be destructive in nature, where the core is destroyed and removed, or non-destructive in nature where at least a portion of the core is removed without damaging or destroying the core, depending on the particular needs of the component.

Figure 4:
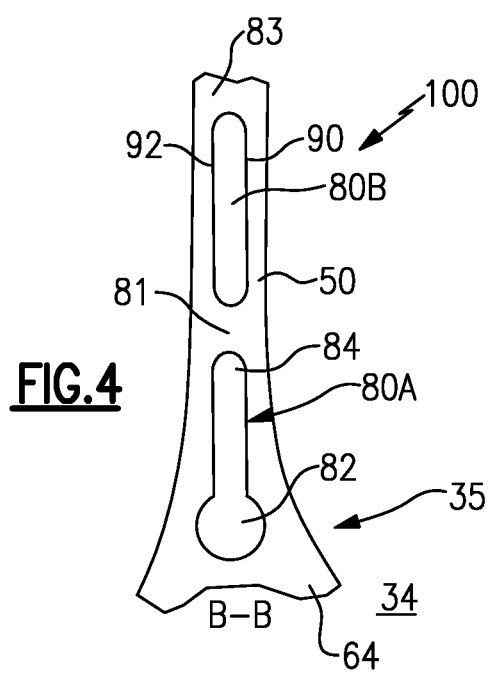
FIG. 4 illustrates a view of a cut-out portion through line B-B of FIG. 3.
Figure 3:
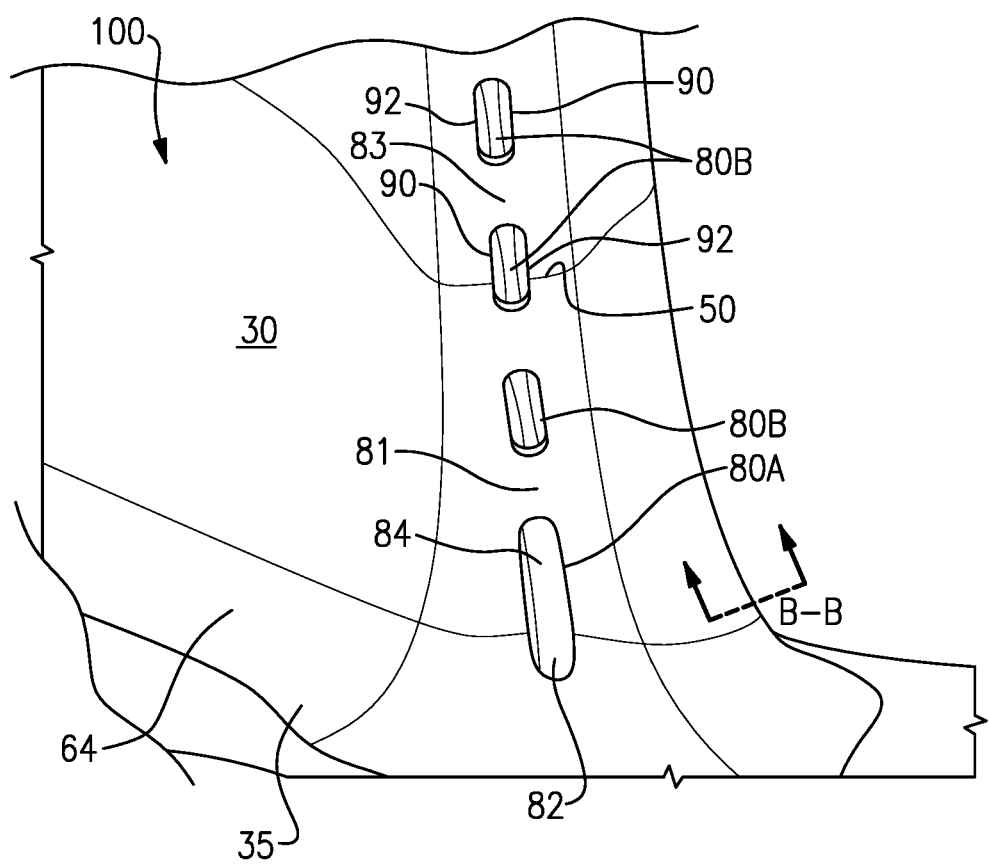
FIG. 3 illustrates a magnified view of a portion of the component of FIG. 2.

FIGS. 3 and 4 illustrate a trailing edge 50 of a body portion 30. The trailing edge 50 includes a plurality of discharge slots 80 for discharging the cooling airflow 70 from the component 100. In this disclosure, the term "slot" is intended to denote any type of opening. Also, although depicted with respect to the trailing edge 50, it should be understood that one or more of the plurality of discharge slots 80 could be positioned at other locations of the body portion 30, including but not limited to, the leading edge 48, the pressure side 52, the suction side 54, the inner platform 34 and/or the outer platform 36.

The plurality of discharge slots 80 can embody a variety of shapes and configurations. For example, any of the plurality of discharge slots 80 could include a pure oval shape (i.e., no straight portions), an elliptical shape, a racetrack shape (i.e., includes two flat sides 90, 92, see discharges slots 80B of FIGS. 3 and 4) or a combination of racetrack shaped and oval shaped (See discharge slots 80A of FIGS. 3 and 4). In this disclosure, an elliptical shape is one type of oval shape that the discharge slots 80 may embody.

In the exemplary embodiment of FIGS. 3 and 4, at least one of the plurality of discharge slots 80 can include a first portion 82 having an oval geometry. The first portion 82 can be elliptical shaped, in one embodiment. The discharge slot 80A that is closest to the gas path sides 35 of the inner platform 34 and the outer platform 36 can include the first portion 82 having the oval geometry (See FIG. 2). In this embodiment, the first portion 82 is positioned at the fillet 64 of the inner platform 34. In another embodiment, the first portion 82 is positioned on the inner platform 34.

The discharge slot 80A can further include a second portion 84 connected to the first portion 82 that includes the racetrack shape. In other words, the discharge slot 80A includes a shape that is a union between a racetrack shape and an oval shape. The first portion (oval geometry) 82 can create a larger radius at the trailing edge 50 at a position closest to the gas path sides 35 of the inner platform 34 and the outer platform 36 through which the stresses associated with the trailing edge 50 can be distributed.

The additional discharge slots 80B of the trailing edge 50 can include racetrack shapes, in one embodiment. It should be understood that any combination, configuration, size or shape of discharge slots 80 may be incorporated into the component 100.

In addition to the shape of the discharge slot 80A, the internal cooling circuit 66 is wider at the base of the discharge slot, with the thickness of the internal cooling circuit increasing as the trailing edge is approached at a consistent span percent. As used herein, the "thickness" of the internal cooling circuit refers to a distance from a pressure side to a suction side of the cooling circuit. This increased width, or thickness is referred to as a flared cooling circuit.

With continued reference to FIGS. 1-3, FIG. 5 schematically illustrates an isometric view of exemplary core 200 for achieving the flared cooling circuit, as well as illustrating a negative of the internal cooling circuit features. The core 200 has a thickness 202 that generally decreases as a trailing edge 204 of the core 200 is approached. The exemplary core 200 includes a first region 206 where the general rule of decreasing thickness 202 is consistent.

Also included in the core 200 is a flared region 210 and a non-flared region 211. Within the flared region 210, the thickness 202 of the core 200 increases as a position moves aft and radially inward. As a result, the flared region 210 has a thickest point 220 at an aftmost, radially inward most portion of the flared region 210. Absent the inner diameter fillet, the thickest point would be at the radially innermost position, however due to the fillet, the thickest point 220 is at a radially inward point, but not the true radially innermost point. The non-flared region 211 may still have a taper, but that taper is generally a consistent taper and the flared region 210 is a region that deviates from the predominant trend of the non-flared region 211.

While illustrated in the exemplary blade as disposed at the radially inner edge of the blade, it is appreciated that alternative examples, such as those utilized in a vane configuration, can include the flared region 210 at a radially outer diameter, or include a flared region 210 at both a radially outer edge and a radially inner edge.

Figure 5:
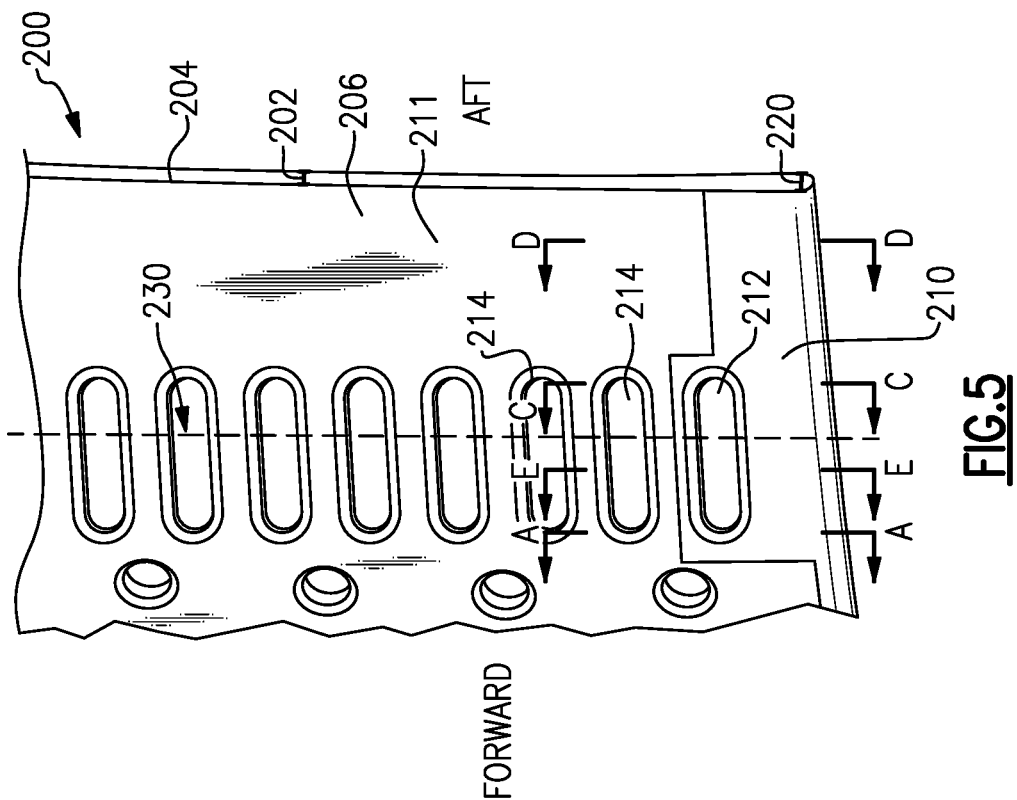
FIG. 5 schematically illustrates an exemplary casting core for forming an internal cooling system and exemplary discharge slots.

In the exemplary embodiment of FIG. 5, the core 200 extends further aftward than the gaspath component, in order to ensure that the slots 80 can be created. The actual casting of the component would include a trailing edge positioned approximately at the dashed line 230, with the remainder of the core 200 extending aftward from the cast component 100.

Figure 6:
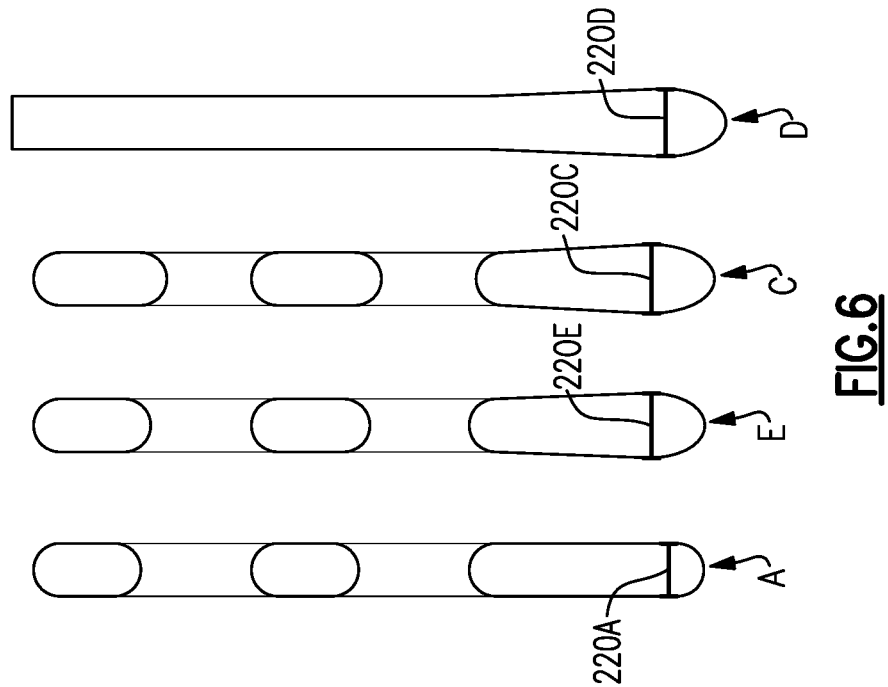
FIG. 6 schematically illustrate cross sections of the core at corresponding sectional lines A, E, C, and D.

Included on the isometric view are four cross sectional lines, A, E, C and D. With continued reference to FIG. 5, FIG. 6 illustrates a rear face view of the core at each of the cross sectional lines A, E, C and D. As can be seen in the rear face view, the thickness 220 of the flared region 210 increases, with the thickness 220A at A being the smallest, the thickness 220E at E being the second smallest, the thickness 220C at C being the third smallest, and the thickness 220D at D being the largest.

Referring again to both FIG. 5 and FIG. 6, the exemplary flared region 210 includes a single opening 212 which would result in the formation of the solid feature 81 of FIGS. 3 and 4. In alternate examples, the flared region 210 can extend farther radially outward, and include one, two, three, or more openings 214 for forming solid features 83 in addition to the illustrated opening 212.

In some examples, the flared region 210 is contained within the filets 64 of the gaspath component. By keeping all, or a portion, of the flared region 210 within the fillets 64, a minimum thickness of the exterior wall around the flared region 210 is maintained, thereby increasing structural soundness of the gaspath component.

Although the different examples include specific components that are shown in the illustrations, embodiments of this disclosure are not limited to those particular combinations. It is possible to use some of the components or features from one of the examples and combination of features or components from another one of the examples. As one non-limiting example, the racetrack shape of the second portion 84 of the discharge slot 80A could be replaced with the elliptical shape from FIG. 6.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a gas turbine engine, comprising:
a body portion that extends between a leading edge and a trailing edge, wherein said trailing edge includes a cooling circuit having a flared region and a non-flared region, the flared region having a first thickness that increases to the trailing edge as the trailing edge is approached at a consistent span and the non-flared region have a second thickness that remains constant or decreases as the trailing edge is approached at a consistent span;
the trailing edge further including at least one discharge slot, and a first discharge slot of the at least one discharge slot is disposed partially within the flared region of the cooling circuit;
and wherein the cooling circuit defines a first width in the flared region and a second width in the non-flared region, the first width being larger than the second width, and wherein the flared region is disposed partially in a filleted region of the body and partially outside of the filleted region of the body.

2. The component as recited in claim 1, wherein the at least one discharge slot has a first portion that includes an oval geometry.

3. The component as recited in claim 1, wherein said component is one of a vane and a blade.

4. The component as recited in claim 1, wherein said at least one discharge slot includes a plurality of second discharge slots.

5. The component as recited in claim 1, further comprising at least a second discharge slot disposed radially outward of the first discharge slot.

6. The component as recited in claim 1, further comprising at least a second discharge slot disposed radially inward of the first discharge slot.

7. The component as recited in claim 1, wherein said at least one discharge slot is positioned at a position that is immediately adjacent to a platform of said component.

8. A gas turbine engine, comprising:
   a compressor section;
   a combustor section in fluid communication with said compressor section along a core flow path;
   a turbine section in fluid communication with said combustor section along said core flow path;
   a component that extends into said core flow path within at least one of said compressor section and said turbine section, wherein said component includes a body portion that extends between a leading edge and a trailing edge;
   wherein the body portion includes an internal cooling circuit having flared region having a first thickness that increases to the trailing edge as the trailing edge is approached at a consistent span and a non-flared region having a second thickness that remains constant or decreases as the trailing edge is approached at a consistent span, and wherein a widest portion of the first thickness is larger than a widest portion of the second thickness; and
   wherein the component further includes at least one internal cooling circuit discharge slot is disposed partially within the flared region, and wherein the flared region is disposed partially in a filleted region of the body portion and partially outside of the filleted region of the body portion.

9. The gas turbine engine as recited in claim 8, wherein said component is one of a vane and a blade.

10. The gas turbine engine as recited in claim 8, wherein the flared region is disposed at a radially innermost edge of the component, relative to a radius of the gas turbine engine.

11. The gas turbine engine as recited in claim 8, wherein the flared region extends less than 100% of the distance from the leading edge to the trailing edge.

\* \* \* \* \*